July 22, 1941.  A. B. EASTWOOD  2,249,814
CUT-OFF MACHINE
Filed Jan. 15, 1940  3 Sheets-Sheet 1
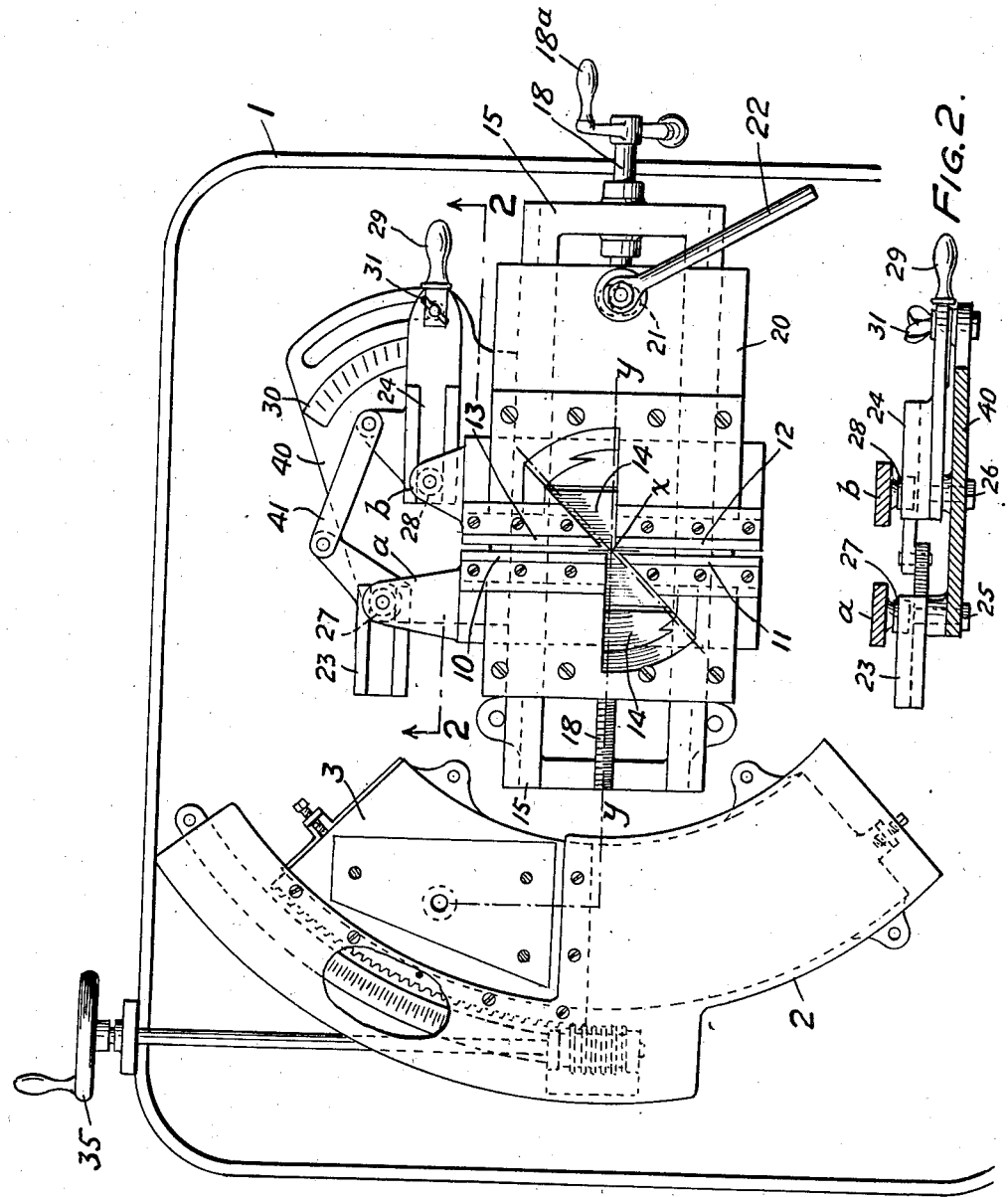
WITNESS:
Robt R Kitchel
INVENTOR
Abraham B. Eastwood
BY
Augustus B. Stoughton
ATTORNEY.

July 22, 1941.    A. B. EASTWOOD    2,249,814
CUT-OFF MACHINE
Filed Jan. 15, 1940    3 Sheets-Sheet 2
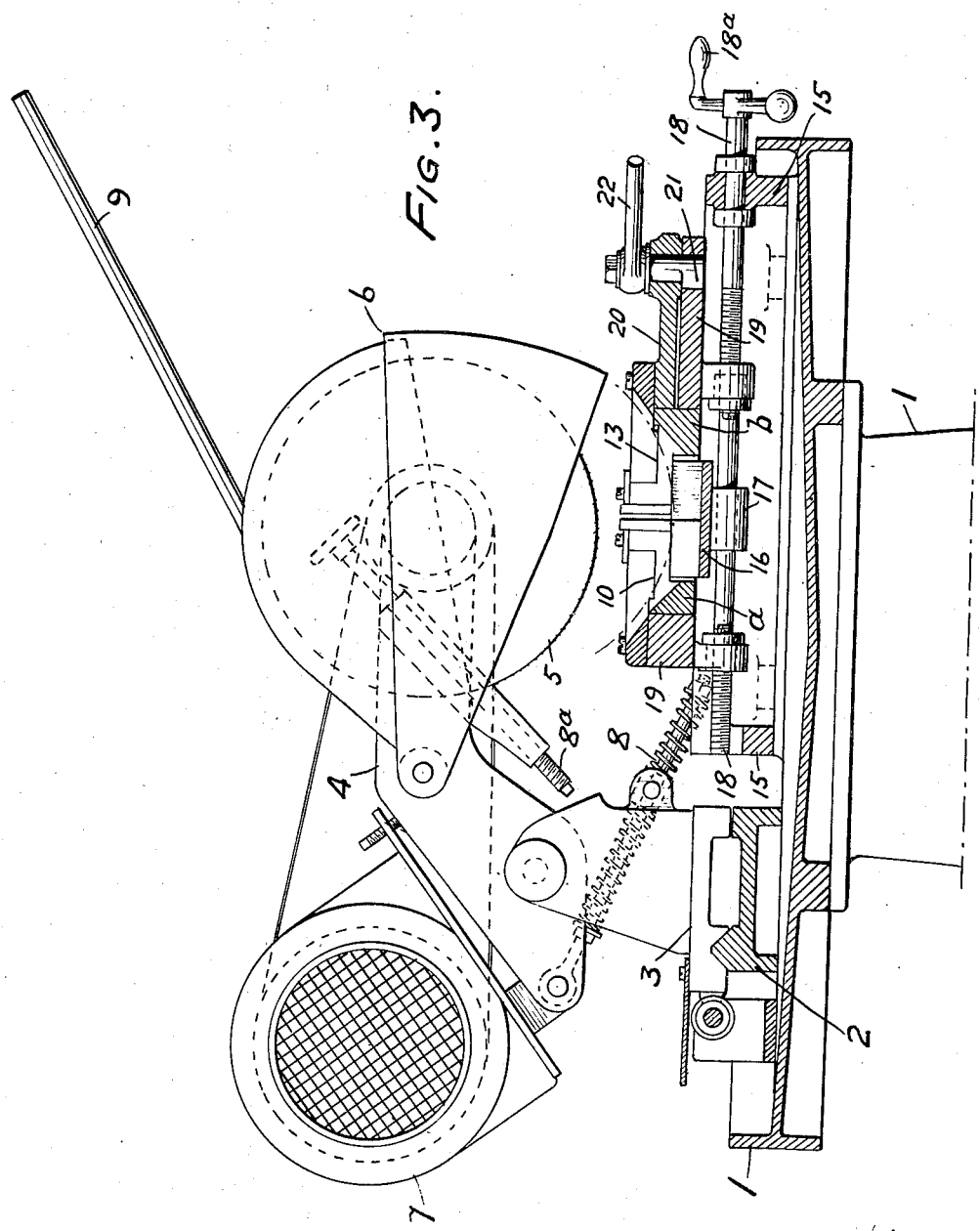
WITNESS:
INVENTOR
Abraham B. Eastwood
BY
Augustus B. Stoughton
ATTORNEY.

July 22, 1941.  A. B. EASTWOOD  2,249,814
CUT-OFF MACHINE
Filed Jan. 15, 1940    3 Sheets-Sheet 3

WITNESS:
Robt P Mitchel.

INVENTOR
Abraham B. Eastwood
BY
Augustus B. Stoughton
ATTORNEY.

Patented July 22, 1941

2,249,814

UNITED STATES PATENT OFFICE 2,249,814

CUT-OFF MACHINE

Abraham B. Eastwood, Abington, Pa., assignor to Wallace Abrasive Machinery Company, Philadelphia, Pa., a corporation of Pennsylvania Application January 15, 1940, Serial No. 313,911

8 Claims. (Cl. 29—69)

The principal object of the present invention is to provide a machine for cutting off at right angles to the longer axis of the work or at an angle thereto as may be required, without changing the direction or position in which the work lies and in which the work is always firmly held; another object of the invention is to provide a machine of simple construction which can be readily and accurately adjusted for the accomplishment of the object stated and to like objects.

Other objects of the invention will appear from the following description at the end of which the invention will be claimed.

Generally stated, the invention comprises a pedestal, quadrant ways on the top of the pedestal located at the back thereof and struck from a center toward the front thereof, a head slidable on said quadrant ways and provided with a vertically movable arm having a rotary disk cutter or saw of which the plane passes through the center from which the ways are struck, two work holding jaws each having two clamping elements and disposed respectively front and back of said center and ranging sidewise on the top of the pedestal and each jaw having a segment of a cavity defined by lines approximating the limit positions of the saw and intersecting at said center and adapted to accommodate the rim of the saw, a slide-way ranging from front to back of the top of the pedestal and on which the respective jaws are movable as units toward and away from the center to accommodate work of different sizes, pivotal guide-ways and roller slides respectively connected with the ends of the jaws and adapted to move one pair of clamping elements endwise in one direction and the other pair of clamping elements endwise in the other direction and near to the faces of the saw in all angular positions thereof, and a pivotal hand lever for turning the pivotal guide ways in consonance with the angular position of the saw.

The invention also comprises the improvements to be presently described and finally claimed.

In the following description reference will be made to the accompanying drawings forming part hereof and in which, Figure 1 is a top or plan view of a machine embodying features of the invention with parts of the superstructure omitted for the sake of clearness.

Figure 2 is a sectional view taken on the line 2—2 of Figure 1.

Figure 3 is a vertical transverse section of the machine; and

Figure 4:
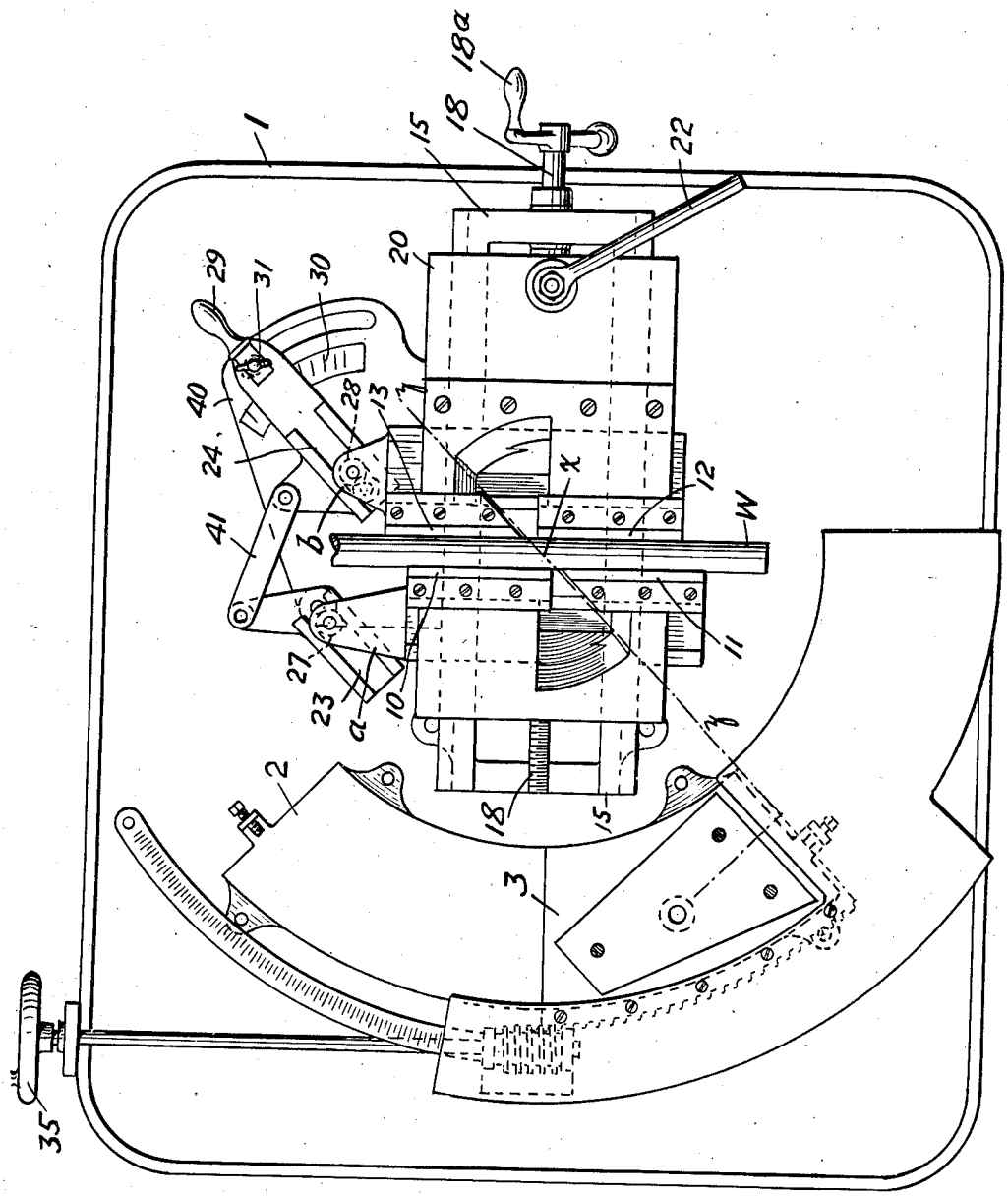
Figure 4 is a view similar to Figure 1 illustrating the position of the parts when work is mounted in the machine and the latter is adjusted to cut at 45° to the longer axis of the work.

Referring to the drawings, 1 indicates a pedestal. 2 indicates quadrant ways mounted on top of the pedestal and located toward the back thereof. These quadrant ways are struck from a center X, Figs. 1 and 4, toward the front of the machine and indicated at the intersection of the dotted lines in Fig. 1. 3, Fig. 3, is a head slidable on the quadrant ways 2 and provided with a pivotally supported vertically movable arm 4 having a rotary disk cutter or saw 5 of which the plane passes through the center X from which the quadrant ways are struck. 6 indicates a hood or guard for the saw. 7 is a motor mounted on the arm 4 and belted to the saw 5 so as to rotate it. 8 indicates a spring counter balance for the arm 4. 8ª indicates a stop for the arm. The arm 4 is provided with a handle bar 9 by which it is brought down to its work. There are two pairs of work clamping elements 10 and 11 and 12 and 13 and each pair is shown as integral with a jaw base a and b, Fig. 3. The pair of elements 10 and 11 and their base a, are disposed back of the center X, and the pair of elements 12 and 13 and their base b, are disposed in front of that center. The clamping elements of each pair and their jaw base range sidewise of the top of the pedestal. One element 11 and its base a, and one clamping element 13 and its base b of the respective pairs are provided with a segment of a cavity 14 defined by the dotted lines in Figure 1 approximating the limit positions of the saw and intersecting at the center X. This cavity is adapted to accommodate the rim of the saw as it cuts through the work as indicated by the dotted line, Fig. 3. The inner or confronting ends of the elements 11 and 13 are beveled or inclined and the inner ends of the elements 10 and 12 range crosswise of them and are flat. There is a slide-way 15 ranging from front to back of the top of the pedestal and it includes a bridge piece 16, Figure 3, having a bearing 17. On this slide-way 15 the pairs of clamping elements 10 and 11 at their base a, and 12 and 13 at their base b, are movable toward and away from the center X, in order to accommodate work W of different sizes. 18 is a screw shaft having threads of different hand and they engage nuts depending from carriers 19 in which are mounted the jaw bases $a$ and $b$. The screw shaft 18 is provided with a handle 18ª. Interposed between one of the jaw carriers 19, the right-hand one in Figure 3, and the jaw base $b$, is an eccentric clamp 20, 21 and 22 which can be operated by the handle 22 and the purpose is to give the elements 12 and 13, after they have been brought to approximate position in respect to the work, W, a slight further clamping motion. 23 and 24 are guide-ways pivoted to a fixed bracket 40 at 25 and 26, Fig. 2, and they cooperate with rollers 27 and 28 connected respectively with the jaw base of each pair of clamping elements. The roller 27 is connected to a tail on the jaw base $a$, and the roller 28 is connected to a tail on the jaw base $b$. One of these guide-ways 24 is provided with a handle 29 which cooperates with an arcuate scale 30 and is provided with a set screw 31. 41 is a link connecting the pivotal slide ways 23 and 24. When the handle 29 is moved, for example from the position shown in Figure 1, the clamping elements 10 and 11 and 12 and 13 are moved endwise in opposite directions.

The operation may be described as follows: Referring to Figure 1, and assuming that the work is to be cut crosswise, the parts will occupy the position shown with the plane of the saw in the dotted line Y—Y. All that is required to be done is to operate the screw shaft 18 by means of the handle 18ª thus moving one pair of clamping elements forward from the center X, and the other pair of clamping elements backward from that center to accommodate the work between the clamping elements. Then the work is clamped by the eccentric 21 operated by the handle 22 and the handle 9 is pulled down to pass the saw through the work. If the cut is to be made at an angle to the axis of the work W, and referring to Figure 4, the hand wheel 35 is turned to cause the head 3 to travel on the quadrant way 2 to the desired position, for example to the position for making a 45° cut on line $z$—$z$. The handle 29 is then unclamped and moved accordingly, for example into the position shown in Figure 4. The clamping element 11 is, therefore, moved in one direction and the clamping element 13 is moved in the other direction. Referring to Figure 4 the base $a$ is moved downward and the base $b$ is moved upward. Thus the clamping elements 11 and 13 are moved out of the range of the saw. The fact that the clamping elements 10 and 12 are also moved is not so important because they are clear of the saw no matter what the size of the work may be. The work W is clamped between the clamping elements in the manner described and the material is cut off by the manipulation of the handle 9, as has been referred to. From this description it will be understood that the parts are adjusted in the way indicated to make a cut at any angle. It may be remarked that the work always occupies the same position crosswise of the machine which, of course, is advantageous, particularly in cases where the work is a long rod and projects beyond the sides of the machine. Of course the extent to which the clamping elements 11 and 13 are moved endwise depends upon the size of the work.

It is not important that the elements or jaws 10 and 12 be slid endwise. However, they are connected with the elements 11 and 13 respectively and are moved with them. The jaws 10 and 11, as a unit, and the jaws 12 and 13, as a unit, are moved sidewise toward and away from each other to accommodate work of different sizes. The elements 10 and 12 have straight ends lying respectively parallel with the line $y$—$y$ of Figure 1 and they are arranged on opposite sides of that line. Therefore, they are always clear of the saw even when the latter is turned into the position $z$—$z$, Figure 4. The construction shown in the drawings by which the elements or jaws 10 and 12 are slid endwise will be described. The jaws 10 and 12 are free to slide endwise in respect to the top of the hollow generally rectangular frame 15 being guided by the jaw carriers 19, Figure 3. The jaw 10 is shifted or slid endwise by the roller 27 and its connections. The jaw 12 is connected with jaw 13 and when the jaw 13 is shifted or slid endwise by the roller 28 the jaw 12 is also shifted.

It will be obvious to those skilled in the art to which the invention relates that modifications may be made in details of construction and arrangement and in matters of mere form without departing from the spirit of the invention which is not limited in respect to such matters, or otherwise than the prior art and the appended claims may require.

I claim:

1. A cut-off machine adapted to cut crosswise of the work and at an inclination thereto comprising the combination of a rotary disk cutter, means for variously positioning the cutter about one of its diameters as a vertical axis located at the point of intersection of two lines of which one lies crosswise of the work and the second lies at an angle to the first, work clamping elements arranged in pairs located on opposite sides of the work and each pair adjustable as a body toward and away from the work, the confronting ends of the elements of each pair being one beveled and the other square, the square ends of the elements lying crosswise of the work and the beveled ends of the elements lying at an inclination to the square ends, provisions for shifting the respective pairs of elements bodily toward and away from the work according to its size and when the work is to be cut crosswise, and mechanism for additionally shifting the elements endwise to locate their beveled ends clear of the cutter in accordance with the inclination at which the work is to be cut.

2. A cut-off machine adapted to cut crosswise of the work at an inclination thereto not exceeding 45° and comprising the combination of a rotary disk cutter, means for variously positioning the cutter about one of its diameters as a vertical axis located at the point of intersection of two lines of which one lies crosswise of the work and the second lies at an angle of 45° to the first, work holding clamping elements arranged in pairs located on opposite sides of the work, and each pair adjustable as a body toward and away from the work, the confronting ends of the elements of each pair being spaced and one being beveled and the other square, the square ends of the elements lying crosswise of the work and the beveled ends of the elements lying at an angle of 45° in respect to the square ends of the elements, provisions for shifting the pairs of elements bodily toward and away from the work according to its size when the work is to be cut crosswise, and mechanism for additionally shifting the elements endwise to locate their beveled ends clear of the cutter and in accordance with the inclination at which the work is to be cut.

3. A cut-off machine adapted to cut crosswise of the work and at an inclination thereto comprising the combination of a pedestal, quadrant ways on the top of the pedestal located at the back thereof and struck from a center toward the front thereof, a head sildable on said quadrant ways and provided with a vertically movable arm having a rotary disk cutter of which the plane passes through the center from which the quadrant ways are struck, work holding elements disposed respectively front and back of said center and ranging sidewise of the top of the pedestal and each having a segment of a cavity defined by lines approximating the limit position of the cutter and intersecting at said center and adapted to accommodate the cutter, a slide-way ranging from front to back of the top of the pedestal and in which said work holding elements are movable toward and away from said center to accommodate work of different sizes, pivotal guide-ways and rollers respectively connected with the ends of the holding elements adapted to move some of these holding elements in one direction and others of the holding elements endwise in the other direction in respect to the defining wall of the cavity and clear of but near to the faces of the cutter in all angular positions thereof, and a pivotal hand lever and link for turning the pivotal guide-ways in consonance with the angular position of the cutter.

4. A cut-off machine adapted to cut crosswise of the work and at an inclination thereto, the combination of a pedestal, a frame mounted on top of the pedestal and ranging from front to back of the machine and having ways and a center bearing for a screw, a screw having threads of opposite hand and arranged in the bearing, clamping element carriers mounted to slide on said ways and having nuts cooperating with said screw and provided with slideways ranging sidewise of the machine, clamping elements arranged in said sidewise ways and having tails at one end, an eccentric binding clamp interposed between one of the clamping elements and its carrier, a pair of grooved levers of which one is a hand lever pivotally connected to the pedestal, a link connected to said grooved levers for moving them in opposite directions, and rollers on the tails working in the grooves of the levers.

5. A cut-off machine adapted to cut crosswise of the work and at an inclination thereto comprising the combination of an upright rotary cutter positionable about a vertical axis passing through its center from crosswise position to any angular position for beveled cutting, confronting elements for clamping the work between them with its center line approximately coincident with said axis, said clamping elements each having a segment of a cavity defined by lines approximating the limit position of the cutter, means for moving said clamping elements toward and away from each other to accommodate work of different size, and slide mechanism independent of the last mentioned means for moving said clamping elements endwise in opposite directions to keep the portions thereof adjacent the inclined defining lines of the segments of the cavity clear of the cutter when work of different sizes is used with the same angular setting of the cutter and when the angular position of the cutter is changed with work of the same size.

6. In a machine adapted to cut crosswise of the work and at an inclination thereto, the combination of a rotary cutter settable in various angular positions about one of its diameters as a vertical axis, confronting clamping elements arranged on opposite sides of the axis and each provided with a segment of a cavity defined by the plane of the cutter in its limit angular positions, means for shifting said elements sidewise toward and away from each other, and mechanism independent of the last mentioned means for shifting said elements endwise to position the segments of the cavity in respect to the plane of the cutter in its various positions.

7. In a machine adapted to cut crosswise of the work and at an inclination thereto, the combination of a rotary cutter settable in various angular positions about one of its diameters as a vertical axis, confronting clamping elements having spaces aligned with said axis and lying on opposite sides thereof, and mechanism for shifting said elements sidewise towards and away from each other, and means independent of the last mentioned mechanism for shifting said elements endwise.

8. In a machine adapted to cut crosswise of the work and at an inclination thereto, the combination of a rotary cutter settable in different angular positions, confronting clamping jaws having cavities with beveled ends to accommodate the cutter, and mechanism for shifting said jaws sidewise towards and away from each other to clamp the work, and means independent of said mechanism for shifting said jaws endwise to position the beveled ends clear of the cutter.

ABRAHAM B. EASTWOOD.